United States Patent
Tsukimoto

[11] Patent Number: 5,886,455
[45] Date of Patent: Mar. 23, 1999

[54] VIBRATION DRIVEN MOTOR

[75] Inventor: Takayuki Tsukimoto, Fujisawa, Japan

[73] Assignee: Canon Kabushiki Kaisha, Japan

[21] Appl. No.: 967,222

[22] Filed: Oct. 29, 1997

Related U.S. Application Data

[63] Continuation of Ser. No. 688,226, Jul. 29, 1996, abandoned, which is a continuation of Ser. No. 609,167, Mar. 1, 1996, abandoned, which is a continuation of Ser. No. 264,747, Jun. 23, 1994, abandoned, which is a continuation of Ser. No. 963,729, Oct. 20, 1996, abandoned.

[30] Foreign Application Priority Data

Oct. 21, 1991 [JP] Japan .................................. 3-272680

[51] Int. Cl.⁶ .................................................. H01L 41/08
[52] U.S. Cl. ............................................................ 310/323
[58] Field of Search ................................... 310/316, 317, 310/319, 323, 328, 312

[56] References Cited

U.S. PATENT DOCUMENTS

| | | | |
|---|---|---|---|
| 4,620,121 | 10/1986 | Mishiro | 310/323 |
| 4,703,214 | 10/1987 | Mishiro | 310/328 |
| 4,705,980 | 11/1987 | Mishiro | 310/323 |
| 4,728,843 | 3/1988 | Mishiro | 310/325 |
| 4,812,697 | 3/1989 | Mishiro | 310/323 |
| 4,893,045 | 1/1990 | Honda | 310/323 |
| 5,162,692 | 11/1992 | Fujimura | 310/323 |

FOREIGN PATENT DOCUMENTS

| | | |
|---|---|---|
| 0 469 883 | of 0000 | European Pat. Off. . |
| 0 198 183 | 2/1986 | European Pat. Off. . |
| 0 420 622 | 4/1991 | European Pat. Off. . |
| 0 450 962 A2 | 10/1991 | European Pat. Off. . |
| 6-3224678 | of 0000 | Japan . |
| 3-040773 | 2/1991 | Japan . |
| 3-103081 | 4/1991 | Japan . |

OTHER PUBLICATIONS

European Search Report dated Oct. 1, 1997.

*Primary Examiner*—Mark O. Budd
*Attorney, Agent, or Firm*—Fitzpatrick, Cella, Harper & Scinto

[57] ABSTRACT

A vibration member generates a first bending vibration on a first plane and a second bending vibration on a second plane transverse to the first plane, and a moving member is driven with a combined vibration of the first and second bending vibrations generated on the first and second planes. The vibration member is machined, or made of different materials, so that the directions of respective natural vibration modes will be predetermined.

32 Claims, 13 Drawing Sheets

FIG. 4 PRIOR ART
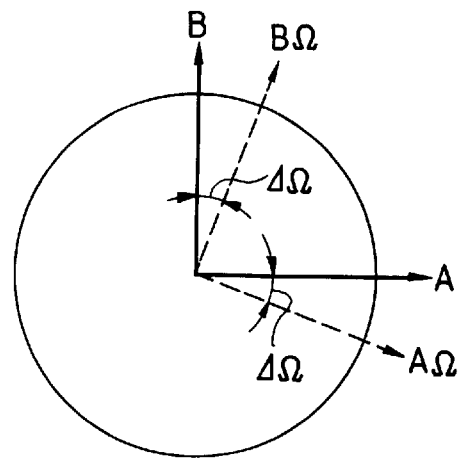
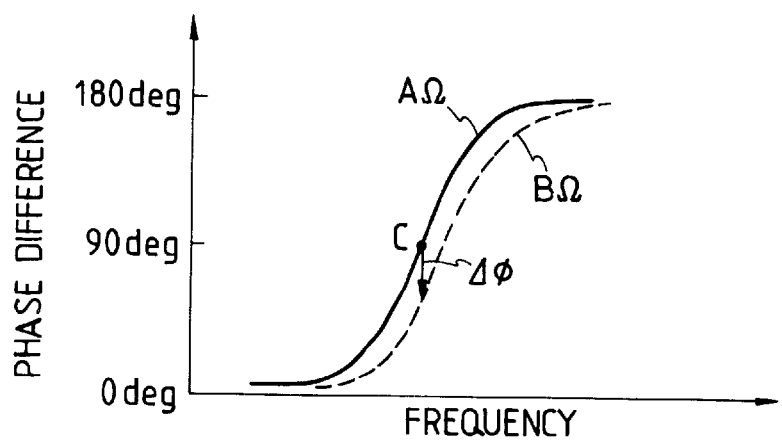
FIG. 5A
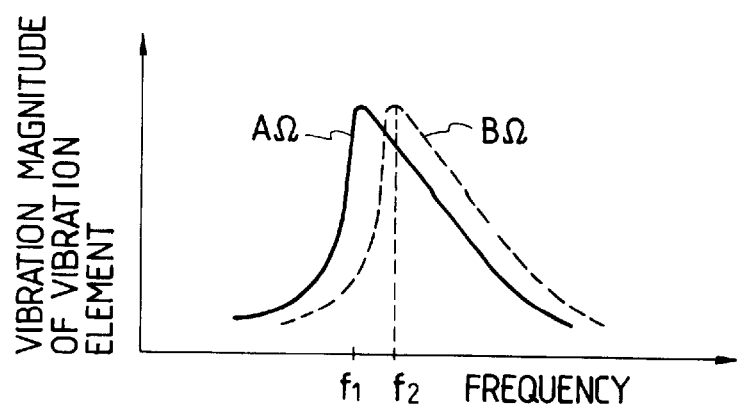
FIG. 5B

FIG. 14A
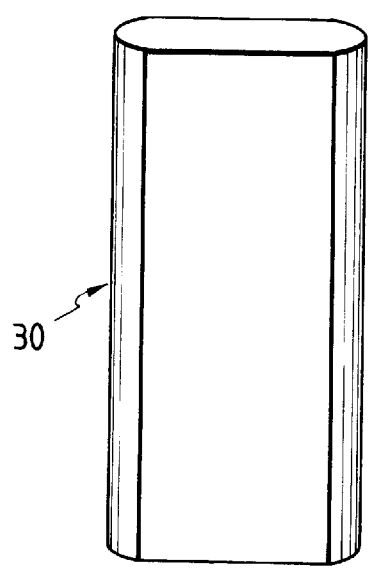
FIG. 14B
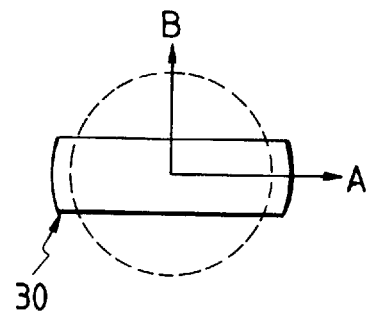
FIG. 14C    FIG. 14D    FIG. 15
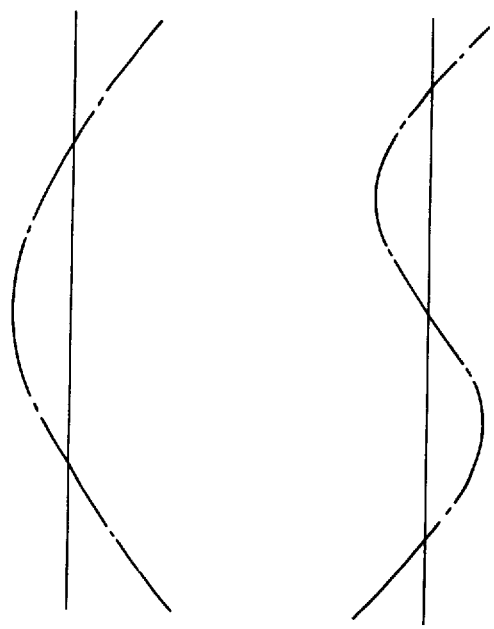
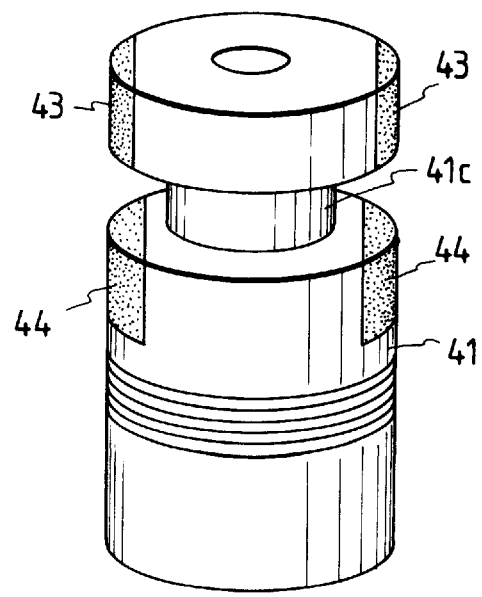

FIG. 18
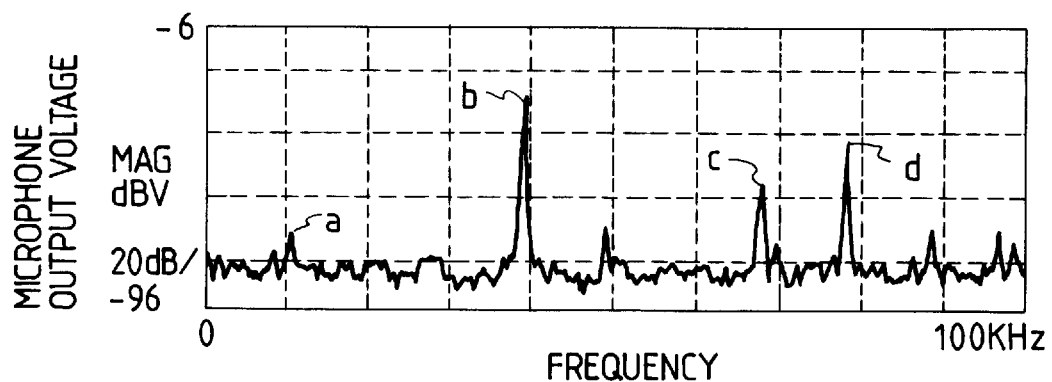
FIG. 19A
FIG. 19B
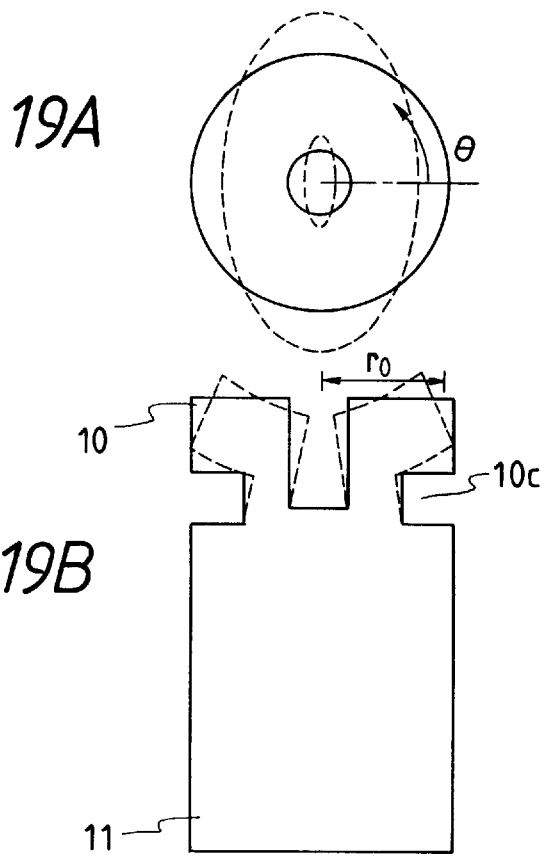

DISTRIBUTION OF DEVIATION IN RADIAL DIRECTION

DISTRIBUTION OF STRAIN OF SIDE SURFACE OF VIBRATION ELEMENT IN LONGITUDINAL DIRECTION

DISTRIBUTION OF VIBRATION DEVIATION IN RADIAL DIRECTION

VIBRATION DRIVEN MOTOR

This application is a continuation of application Ser. No. 08/688,226 filed Jul. 29, 1996, now abandoned, which is a continuation of application Ser. No. 08/609,167 filed Mar. 1, 1996, now abandoned, which is a continuation of application Ser. No. 08/264,747 filed Jun. 23, 1994, now abandoned, which is a continuation of application Ser. No. 08/963,729 filed Oct. 20, 1992, now abandoned.

BACKGROUND OF THE INVENTION

1. Field of the Invention

The present invention relates to an ultrasonic vibration driven motor. More particularly, the invention relates to an ultrasonic vibration driven motor in which, when electrical energy is fed to piezoelectric elements or other electromechanical energy conversion elements of the motor, a vibration member of the motor, for example a bar or pencil type vibration motor, which clamps the electromechanical energy conversion elements from the lateral sides of the conversion elements, bends and vibrates, so that surface portions of the vibration member make a circular or elliptical movement, whereby a moving member pressed against the vibration member is driven by friction.

2. Related Background Art

In a vibration member of a bar-type ultrasonic motor, as shown in FIGS. 2 and 3, two pairs of phase-A and phase-B driving piezoelectric elements (hereafter, PZT) 1 and 2, and a sensor PZT 3 are clamped between vibration member structures 4 and 5, (made of an iron, copper, aluminum, or other metal having a low damping characteristic), and secured with a tightening bolt (not shown). Thus, the vibration member is axially symmetrical as a whole, and has degeneracy in which two transverse bending vibration modes have the same shape and same undamped natural frequency. Reference numerals d1 to d6 denote electrode disks. An $a_1 \sin \omega t$ driving signal is fed to the phase-A PZT 1, and an $a_2 \cos \omega t$ driving voltage is applied to the phase-B PZT 2.

Therefore, as a positional phase difference between two pairs of phases A and B is held at 90°, vibrations develop in the direction of an excitation force applied to PZTs. That is to say, two bending vibrations develop with a positional phase difference of 90°.

As a temporal phase difference between AC fields applied to these driving PZTs is held at 90°, a temporal phase difference between bending vibrations is retained around 90°. When the strengths of the AC fields applied to the PZTs are adjusted, the bending vibrations will have the same amplitude.

As a result, portions surface of the vibrating member make a circular movement within a plane transverse to the axis. When a moving member (not shown) is pressed on the vibrating member to rub against these portions, the moving member is thus frictionally driven.

The bar-type ultrasonic vibration driven motor is shaped axially symmetrically. However, a machining error or presence of screws prevents the motor from having a perfectly axially symmetrical shape. Due to influence of heterogeneous materials or irregular clamping pressure, the degeneracy of modes is destroyed, the directions of transverse natural vibration modes are determined uniquely, and the undamped natural frequencies of the natural vibration modes differ from each other.

Since the causes of the foregoing problems are uncertain, the directions of the natural vibration modes cannot be detected in advance.

Due to the aforesaid causes, the directions of arranging the driving PZTs differ from the unique directions of the natural vibration modes. This poses the problems below.

As shown in FIG. 4, assume that the directions of the natural modes, AΩ and BΩ, deviate by ΔΩ from the directions of phase-A and phase-B PZTs, A and B to be arranged mutually transversely.

The phase-A PZTs excite two standing waves of vibrations in the AΩ and BΩ directions according to the deviation ΔΩ.

A response phase of a displacement deriving from an excitation force, as shown in FIGS. 5A and 5B, varies greatly with frequencies around an undamped natural frequency. Therefore, when the undamped natural frequencies in the AΩ and BΩ directions differ from each other, as shown in FIG. 5A, the bi-directional vibration phases excited by the phase-A PZTs 1 differ from each other. The phase difference is represented as Δφ.

Assuming that an AΩ direction component of an excited vibration displacement is a×sin (ωt), a BΩ direction component is provided as b×sin (ωt+Δφ).

On the other hand, when an AC field shifted by a phase, Δψ, from an AC field applied to the phase-A PZTs 1 is applied to the phase-B PZTs 2, bi-directional vibrations (standing waves) are excited. The vibrations in the AΩ and BΩ directions are provided as b×sin (ωt+Δψ) and a×sin (ωt+Δφ+Δψ) respectively, where a:b=cosΔΩ:sin ΔΩ.

In the foregoing situation; that is, when the electrode patterns of the PZTs differ from the directions of the natural vibration modes, if the phase difference Δψ is set to an appropriate value, then the surface portions of the vibration member make a circular movement. However, Δφ or ΔΩ has a nature of varying depending on a motor. It is, therefore, impossible to set Δψ to a value causing the circular movement in practice.

SUMMARY OF THE INVENTION

An object of the present invention is to provide a vibration member in which surface portions of the vibration member make a circular movement despite the presence of a machining error.

Another object of the present invention is to provide a vibration member in which surface portions of the vibration member make a circular movement despite heterogeneous materials or irregular clamping pressures.

Another object of the present invention is to provide a vibration driven device in which surface portions of a vibration member make a near circular movement despite a machining error or heterogeneous materials, whereby a moving member is driven efficiently.

Other objects of the present invention will be apparent from the detailed description below.

In one aspect of the present invention, a vibration member generates a first bending vibration on a first plane and a second bending vibration on a second plane transverse to the first plane, and a moving member is driven by a combined vibration of the first and second bending vibrations generated on the first and second planes. The vibration member is machined or made of different materials so that the directions of natural vibration modes will be determined forcibly.

In another aspect of the present invention, a vibration member having a specific shape predetermines the directions of two natural vibration modes and a driven member to be driven by the Vibration member.

BRIEF DESCRIPTION OF THE DRAWINGS

FIG. 4 shows the relationship between the directions of arranging phase-A and phase-B PZTs and the directions of natural vibration modes;

FIGS. 5A and 5B are characteristic curves of a vibration member for an ultrasonic vibration driven motor;

FIGS. 14A to 14D show a sixth embodiment;

FIG. 15 shows a seventh embodiment;

FIG. 18 shows a vibration spectrum;

FIGS. 19A and 19B show bending deformation of a vibration member;

DESCRIPTION OF THE PREFERRED EMBODIMENTS

Figure 1:
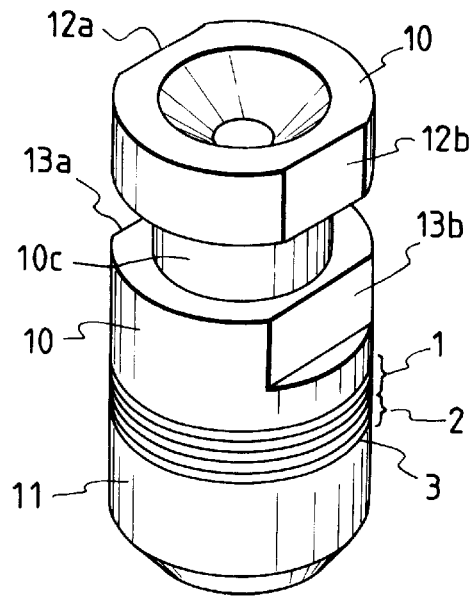
FIG. 1 is an oblique view showing the first embodiment of an ultrasonic vibration driven motor according to the present invention.

FIG. 1 shows a vibration member of a first embodiment of an ultrasonic vibration driven motor according to the present invention.

Figure 2:
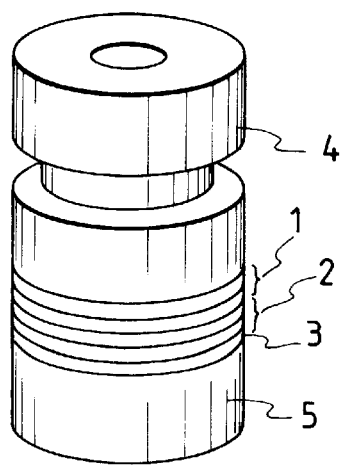
FIG. 2 is an oblique view showing a conventional vibration member.

10 and 11 denote cylindrical vibration member structures. Similarly to the prior art shown in FIGS. 2 and 3, phase-A PZTs 1 and phase-B PZTs 2, a sensor PZT 3 for detecting a vibration, and electrode disks are clamped between the cylindrical structures 10 and 11, and secured with a tightening bolt which is not shown.

Figure 3:
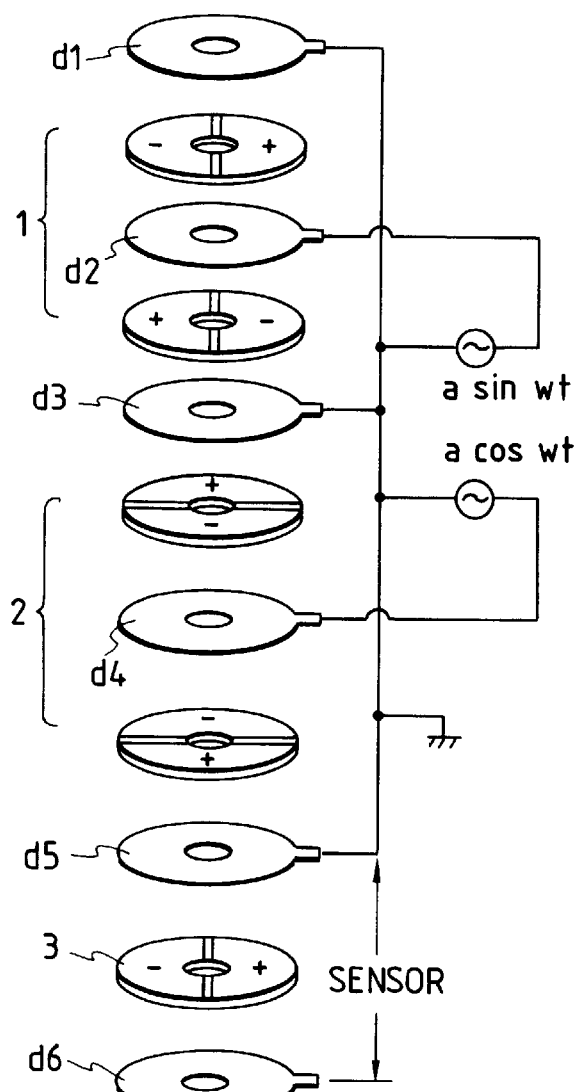
FIG. 3 is an oblique view showing PZTs, electrode patterns, and their wiring.
Figure 6:
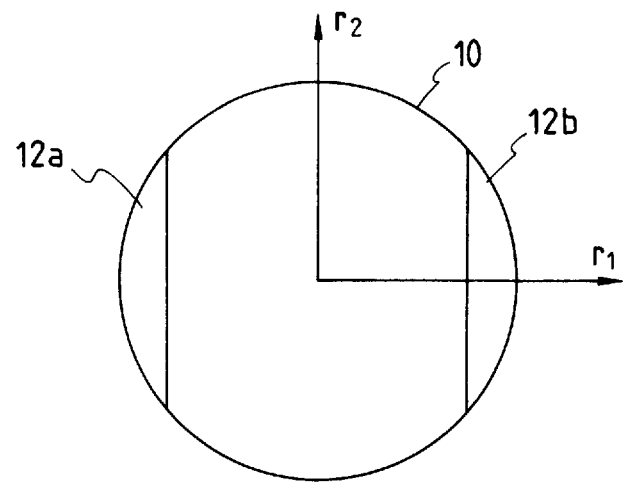
FIG. 6 shows the vibrating directions of a vibration member of the first embodiment.
Figure 8:
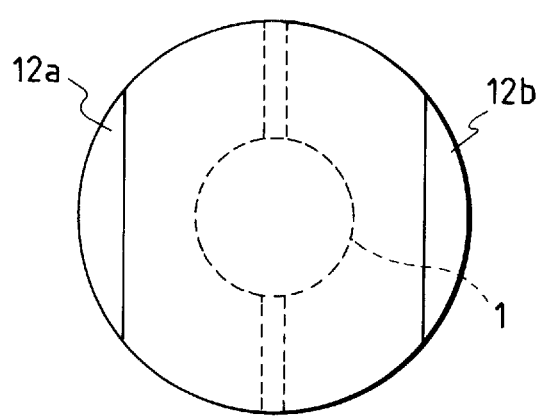
FIG. 8 shows the electrode pattern and relative positional phases of chamfered portions.
Figure 9:
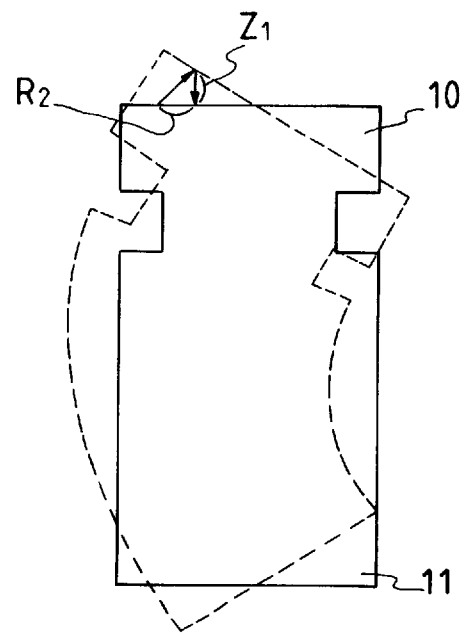
FIG. 9 shows a difference between deformation angles deriving from vibration modes formed on an end of a vibration member that is in contact with a moving member.

The top of the vibration member structure 10 on the upper side of FIG. 1 is brought into contact with a moving member which is not shown, and thus drives the moving member by means of friction. A circumferential groove 10c having a concave cross section is formed to increase a displacement of the vibration member structure 10 that is in contact with the moving member. The shape of the vibration member described so far is identical to that of a conventional vibration member. In this embodiment, chamfered portions 12a and 12b are formed above the circumferential groove 10c so that the chamfered portions will face each other. The borders of electrode patterns on the phase-A PZTs 1 shown in FIGS. 6 and 3 are arranged as shown in FIG. 8 relative to the chamfered planes of the vibration member, so that the phase-A PZTs 1 will excite a vibration mode transverse to the two chamfered planes (in the r1 direction). The borders of electrode patterns on the phase-B PZTs 2 are positioned perpendicularly to those on the phase-A PZTs 1 so that the phase-B PZTs 2 will excite a vibration mode in the r2 direction. In the vibration member structure 10 of this embodiment, notches 13a and 13b are formed below the circumferential groove 10c so that the notches 13a and 13b will be in phase with the chamfered portions 12a and 12b from a positional viewpoint.

In this embodiment, when a vibration develops, the chamfered portions 12a and 12b strain little and displace greatly. Owing to the presence of the chamfered portions, a decrease corresponding to a strain energy in the vibration mode is greater than that corresponding to a motion energy. This increases an undamped natural frequency in the r1 direction. The inverse applies to the notches 13a and 13b. A change in an undamped natural frequency in the r2 direction is smaller than that in the r1 direction.

Based on the foregoing properties, the frequencies or directions of natural vibration modes can be adjusted by varying the sizes of chamfered portions.

The vibration member shown in FIG. 1 is 17.7 mm long, and 10 mm in diameter. The concave portion 10c is 6 mm in diameter. The chamfered portions 12a and 12b are 0.4 mm deep. The notches 13a and 13b are chamfers of 1.25 mm deep and 2.05 mm long. The structures are made of Bs. As for the undamped natural frequencies, the vibration mode in the r2 direction is 41.54 kHz, and the vibration mode in the r1 direction is 41.50 kHz. Thus, the undamped natural frequency differs slightly with the vibration mode.

Figure 7A:
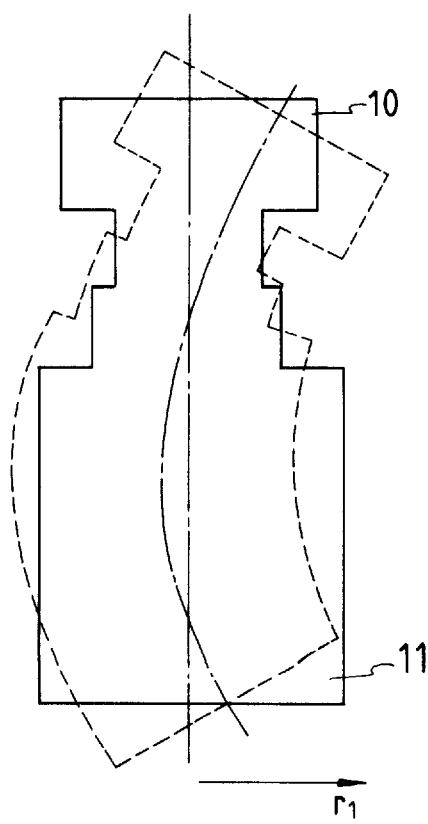
FIGS. 7A and 7B show displacements in a radial direction of a vibration member of the first embodiment.
Figure 7B:
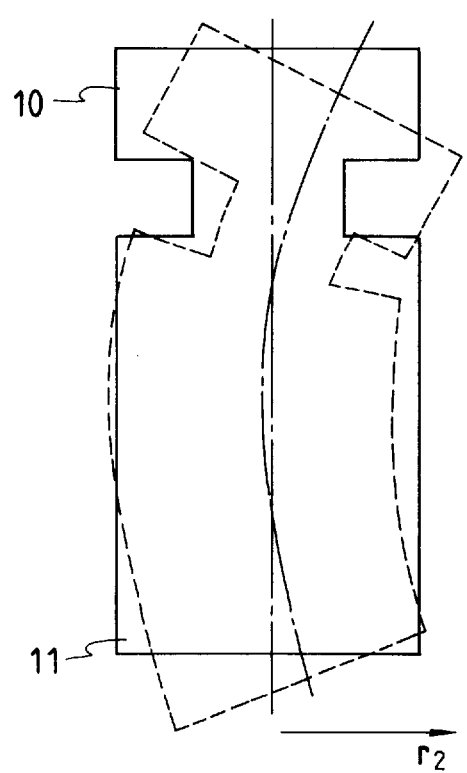

FIGS. 7A and 7B show radial displacement distributions representing the vibration modes in the r1 and r2 directions. FIGS. 7A and 7B demonstrate that the displacements in the r1 and r2 directions differ slightly. However, a difference between deformation angles due to the vibration modes formed on the end of the vibration member which is in contact with a moving member is as small as 0.6°. Influence of the difference on motor performance is, therefore, negligible.

Axial asymmetry of an entire vibration member caused by the chamfered portions 12a and 12b, and the notches 13a and 13b is much more intensive than that due to a machining error. Therefore, the directions of natural vibration modes do not vary among vibration members. In short, when a vibration member is chamfered or notched, the directions of vibration modes are held constant despite heterogenous materials, irregularity in clamping pressure, or a machining error.

Therefore, only when two pairs of driving PZTs 1 and PZTs 2 are arranged in the directions of vibration modes that are predetermined in the process of machining, a pair of driving PZTs excites one mode without fail. Thus, an efficient motor ensues.

When a sensor PZT 3 (See FIG. 3) is arranged in either of the directions of the vibration modes, vibration information in that direction alone is acquired without fail. Therefore, when a phase difference between a voltage applied to the phase-A PZTs 1 or phase-B PZTs 2 and an output voltage of the sensor PZT 3 is detected to adjust a frequency, the vibration member can always be driven at a resonance frequency. The direction of arranging the sensor PZT 3 may align with either of the directions of the phase-A PZTs 1 and phase-B PZTs 2. In general, the sensor PZT 3 is oriented in the direction of the vibration mode having a higher undamped natural frequency.

This is attributable to the fact that an amplitude-frequency characteristic of a vibration member for an ultrasonic vibration driven motor is non-linearity as shown in FIG. 5B, and provides a gentle rise for frequencies higher than a resonance frequency f1 or f2 and a steep fall for frequencies lower than that. Therefore, when a vibration driven motor is driven, frequencies are usually swept from higher to lower.

When the detected phase difference reaches a specified value (90°), the frequency of a driving signal fed to the driving PZTs should be shifted away from or higher than a resonance frequency of the other vibration mode. The phase shift contributes to a decrease in amplitude of other vibration mode which is not subjected to detection.

To be more specific, when the sensor PZT 3 is driven with the undamped natural frequency of a vibration mode which is lower than that of the other vibration mode, the driving frequency becomes lower than a resonance frequency (undamped natural frequency) of the other vibration mode. In terms of the frequency characteristic of the other vibration mode, the amplitude of the other vibration mode becomes very low. With the vibrations combined this time, the surface portions of the vibration member make a linear movement. Therefore, a moving member is driven by friction inefficiently.

As described above, the present invention provides a vibration member with less variation in motor performance among motors or less variation in motor performance in the rotating direction of a moving member.

Figure 17A:
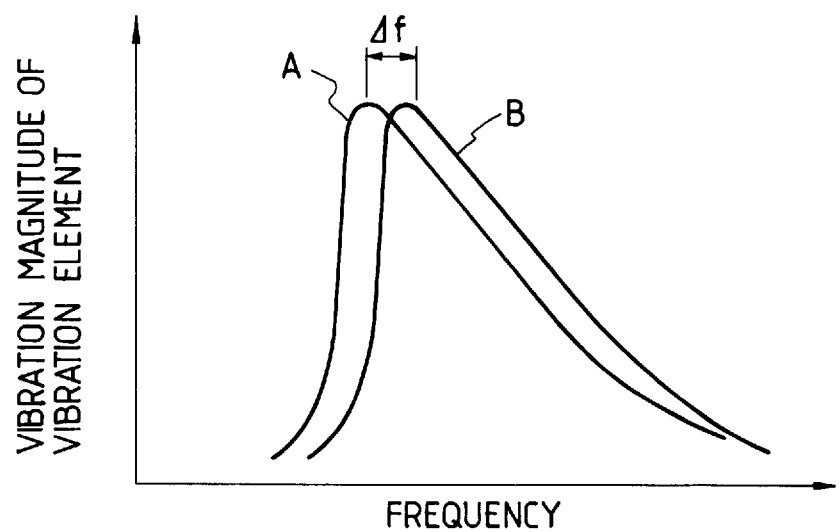
FIGS. 17A and 17B show characteristic curves of an ultrasonic vibration driven motor.

As shown in FIG. 17A, since a difference in undamped natural frequency between vibration modes is $\Delta f$, when AC fields having the same frequency are applied to the phase-A PZTs and phase-B PZTs, vibration displacements due to the AC fields provide different response phases. Even when a phase difference between the AC fields of two phases is set to 90°, similarly to that in a conventional motor, a phase difference between mechanical vibrations occurring in a vibration member does not reach 90°. Consequently, motor efficiency deteriorates.

Therefore, a phase difference between supply AC fields of the two phases must be specified so as to cover the above difference or delay of one response phase from another.

Figure 17B:
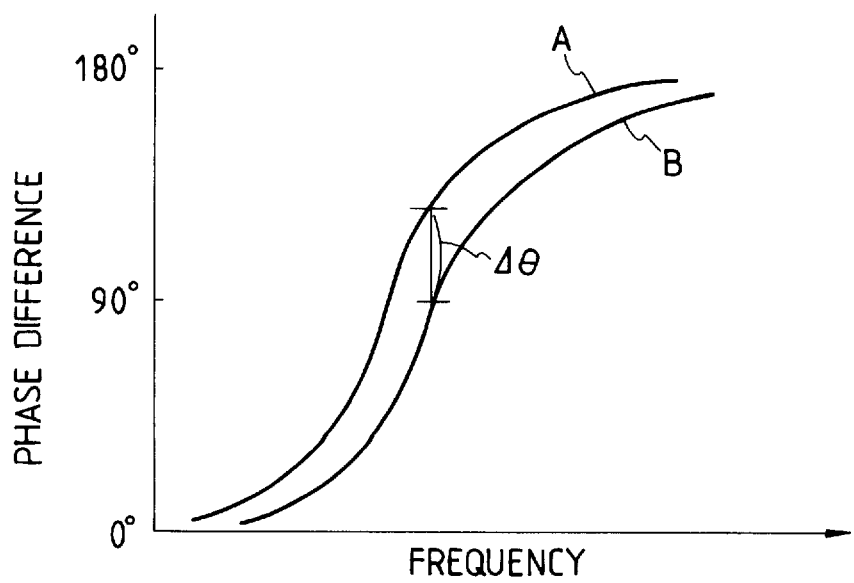

More specifically, phase shifts corresponding to frequency differences, $\Delta f$, are measured by experiment. Consequently, a graph shown in FIG. 17B is plotted. Thereby, when a response phase delay is represented as $\Delta\theta$, an AC field applied in the A direction is shifted to lead by $\Delta\theta$. Thus, the AC field should, preferably, be applied in the A direction with a phase difference of $(90+\Delta\theta)°$ or $(-90+\Delta\theta)°$ relative to an AC field applied in the B direction.

Therefore, vibration displacements in these directions are always large and the phase difference is 90° or −90°. Therefore, a variation in motor performance among motors is reduced to provide an efficient motor.

With the aforesaid dimensions and undamped natural frequencies, a response phase difference between two directions, $\Delta\theta$, is less than 30° for the first embodiment.

The shape of a vibration member is not limited to the one shown in FIG. 1. Furthermore, the sensor PZT 3 may be used to detect a higher undamped natural frequency, so that a vibration member will be driven with the detected higher frequency.

The above description of the present embodiment relates to improvement of motor efficiency. When a vibration member has a shape shown in FIG. 1, occurrence of a buzz can be prevented.

In a pencil-type ultrasonic vibration driven motor that is shaped like a bar, a buzz occurs during driving. When the motor is mounted in, for example, a camera, this phenomenon is irritating to a user. A buzz must be avoided.

When a buzz occurs, vibration components developing in a motor are collected using a microphone, then analyzed using an FET analyzer. The results are plotted as shown in FIG. 18.

A vibration spectrum, a, rating below an audible frequency 20 kHz represents an output voltage of the microphone corresponding to a vibration component causing a buzz. A vibration spectrum b represents a vibration component for driving a motor. A vibration component d has a frequency twice as high as that of the vibration component for driving a motor. This component results from a non-linear vibration generated by a vibration member being driven due mainly to friction or contact, which, therefore, appears frequently.

Next, a component of a vibration spectrum c is a natural vibration of a vibration member. This vibration mode will be described in conjunction with FIGS. 19A and 19B. FIG. 19A is a plan view of a vibration member, and FIG. 19B is a cross-sectional diagram of a plane including the axis of the vibration member. Dashed lines indicate vibration displacement distributions. As shown in FIG. 19B, when the vibration member forms a natural vibration mode, only an upper portion of the vibration member located above the circumferential groove 10c running on the axis of the vibration member bends and deforms.

Figure 20:
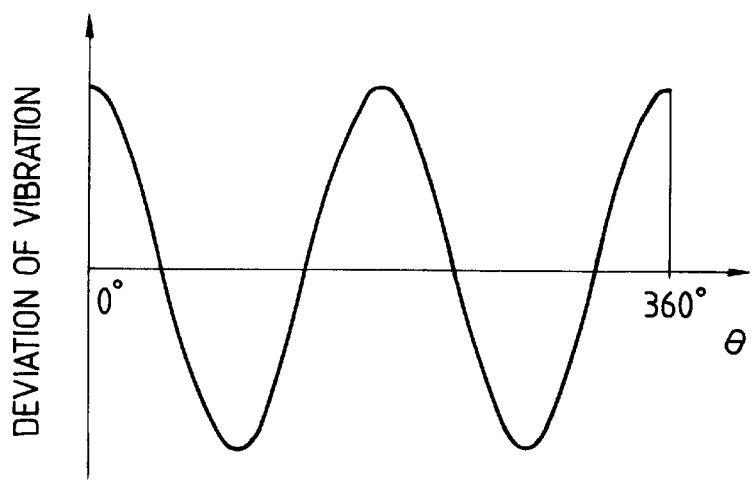
FIG. 20 shows an axial displacement distribution of a vibration member shown in FIG. 19.

FIG. 20 shows an axial displacement distribution on the circumference of the end of a vibration member that has a radius $r_0$ and is in contact with a moving member. As shown in FIG. 20, the secondary vibration on the circumference of the end shows a displacement distribution in the form of a sine wave. The frequency of a vibration spectrum, a, corresponds to a difference frequency between frequencies of vibration components c and d, which results from occurrence of a natural vibration c. Therefore, a buzz can be avoided by preventing the occurrence of the natural vibration.

Figure 21:
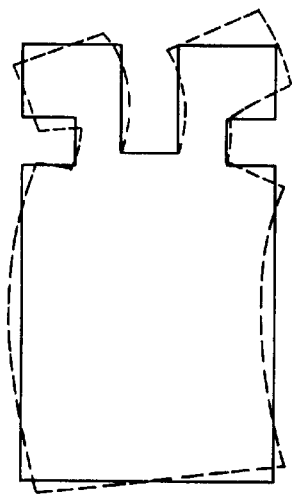
FIG. 21 shows a state in which a secondary bending vibration develops.

On the other hand, when the shape of a vibration member or a moving member, a load applied to a motor, an amplitude of the vibration member, and other motor driving conditions are modified, the vibration member may generate a secondary bar-type bending vibration as shown in FIG. 21 instead of the aforesaid vibration mode. The undamped natural frequency causing this vibration is represented as $c_2$.

Based on the aforesaid relationship between the frequency and the output voltage of the microphone, such a vibration member is conceivable that undamped natural frequencies of vibration components c and $c_2$, and other vibration modes causing buzzes are set to (outside the audible frequency band) deviate by 20 kHz from those of the vibration components b and d. This method greatly restricts the shape of a vibration member and driving frequencies, but does not subdue a phenomenon causing the vibration components c and d. Furthermore, the vibration components are superimposed on a vibration the sensor PZT 3 attempts to detect, thus disabling natural vibration control.

Then, an attempt is made to eliminate the vibration spectrum, a, causing a buzz by preventing occurrence of vibrations having vibration components c and $c_2$.

When an energy source causing the foregoing vibration components is considered, a driving AC signal does not contain frequency components corresponding to the vibration components. Moreover, a buzz occurs only when a motor is driven. This leads to a conclusion that the energy source is a friction force.

In recent years, measurements and analyses have confirmed that a drive of an ultrasonic vibration driven motor is accompanied by a slip or a relative difference in rotating speed between a moving body and a vibration member, which appears in a contact surface of the moving body and vibration motor. It has also been revealed that vibrations c and $c_2$ causing buzzes are progressive waves.

This means that a vibration for canceling out the relative difference in rotating speed; that is, a vibration causing a circular or elliptic movement in the contact area develops on a self-excitation basis.

In practice, with occurrence of a progressive wave of a vibration c or $c_2$, the surface portions of a vibration member make a circular or elliptic movement.

This phenomenon is identified in an annular-type ultrasonic motor for driving an auto-focus camera lens. (Refer to the collection of manuscripts of lectures for the Convention of the Association of Applied Physics for Spring of 1990, 29P-Z-6.)

Buzzes can be avoided by preventing occurrence of vibration modes in which the surface portions on the contact plane between a vibration member and a moving body may make an elliptic movement, or vibration modes in which the contact surface of a vibration member in an ultrasonic vibration driven motor of this embodiment is displaced externally.

Progressive waves are generated when two transverse natural vibration modes are excited and the relative temporal phase difference between the progressive waves is held at 90°.

When the undamped natural frequencies of the two natural vibration modes differ greatly, no frequencies cause a phase difference of 90° and have large amplitudes. Therefore, progressive waves; that is, vibrations causing buzzes hardly develop.

This means that when frequencies of sin and cos vibration modes for a vibration causing a buzz are deviated from each other, no buzz occurs.

Therefore, the ratios of the mass and stiffness of the sin mode for a buzz vibration to those of the cos modes must differ from each other.

The modification is achieved by making part of a vibration member heterogeneous in terms of motion stiffness.

At this time, it is preferred that the undamped natural frequencies of sin and cos vibration modes for a bending vibration mode for driving a motor be substantially the same. This avoids adverse influence on driving vibrations to guarantee reliable motor performance.

Therefore, the ratios of the mass and stiffness of the sin mode for a driving vibration mode to those of the cos mode must be held the same, wherein the masses and stiffnesses are different values.

However, for a buzz vibration mode, the ratios of the mass and stiffness of the sin mode to those of the cos mode must differ from each other. Then, the shape of the vibration member is determined to meet these requirements.

The shape of the vibration member shown in FIG. 1 meets the requirements. Specifically, when a vibration mode c causing a buzz is formed, the chamfered portions 12a and 12b of the vibration member structure 10 affect the undamped natural frequency. This mode hardly vibrates and displaces the lower part of the vibration member that is below the circumferential groove 10c.

Figure 22:
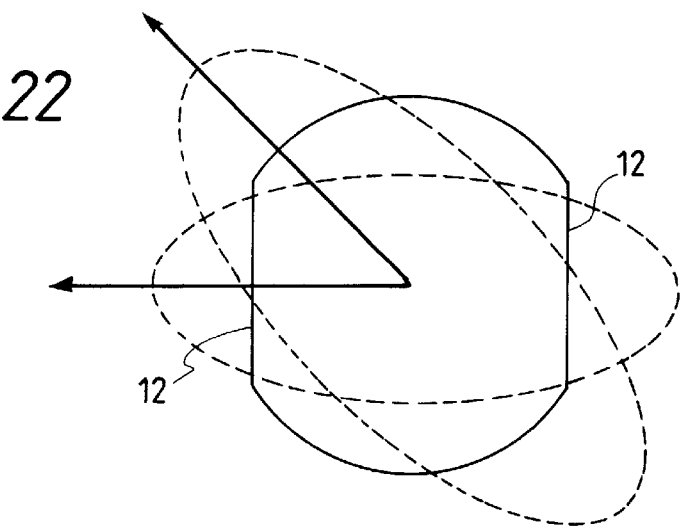
FIG. 22 is a plan view of the top of a vibration member.

As apparent from the top view of the vibration member in FIG. 22, the chamfers affect the sin and cos modes for the vibration mode c differently.

Figure 23A:
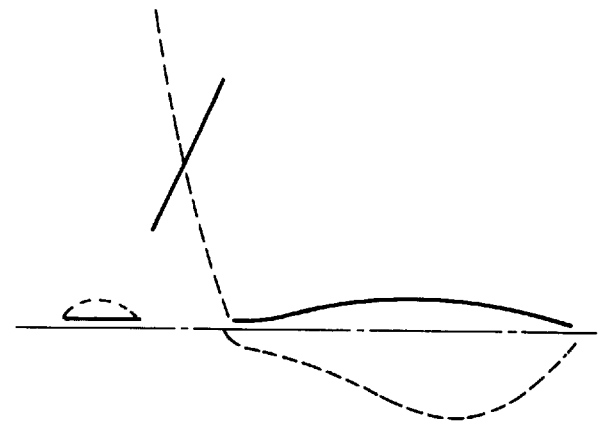
FIGS. 23A to 23C show radial displacement distributions of a vibration member.
Figure 23B:
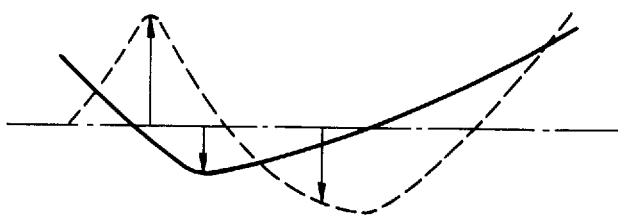

FIG. 23B shows a vibration $c_2$ of a vibration member shown in FIG. 23A and a radial displacement distribution of the axis of the vibration member generating a driving vibration mode. A dashed line indicates the $c_2$, and a solid line indicates the driving vibration.

Figure 23C:
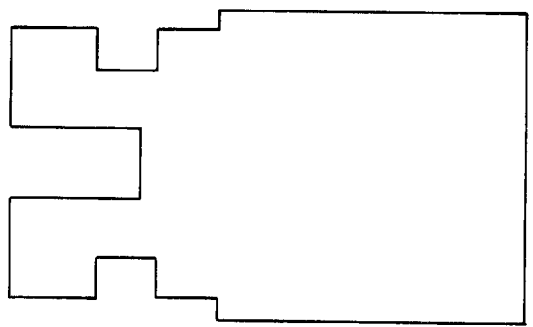

FIG. 23C shows an axial strain distribution on a side surface of a vibration member.

FIGS. 23A, 23B, and 23C demonstrate that both the displacement and strain distributions differ between the vibration modes. The presence of the chamfered portions 12a and 12b, and 13a and 13b affects the masses and stiffnesses differently between the vibration modes.

When the sizes of the chamfered portions 12 and 13 are determined so that the undamped natural frequencies of the sin and cos modes for a driving mode will be substantially the same (ratios of masses and stiffnesses), the undamped natural frequencies of the sin and cos modes for the $c_2$ vibration mode differ from each other.

In practice, the undamped natural frequencies for the driving vibration mode are 41.54 kHz in the B direction and 41.50 kHz in the A direction. The difference is about 40 Hz. The undamped natural frequencies for the vibration mode c are 68.5 kHz and 70.2 kHz, while those for the vibration mode $c_2$ are 82.3 kHz and 84.2 kHz. The differences are 1.7 kHz and 2.1 kHz respectively. Thus, buzzes are avoidable without degradation of motor performance. In this embodiment, the driving vibration mode is formed so that one of the undamped natural frequencies will be 40 Hz higher. On the contrary, the undamped natural frequencies for the driving vibration mode may be the same.

The shape of a vibration member capable of avoiding a buzz is not limited to the one shown in FIG. 1, but may be as shown in FIGS. 24, 25, 26, 27A, 27B and 27C.

Figure 24:
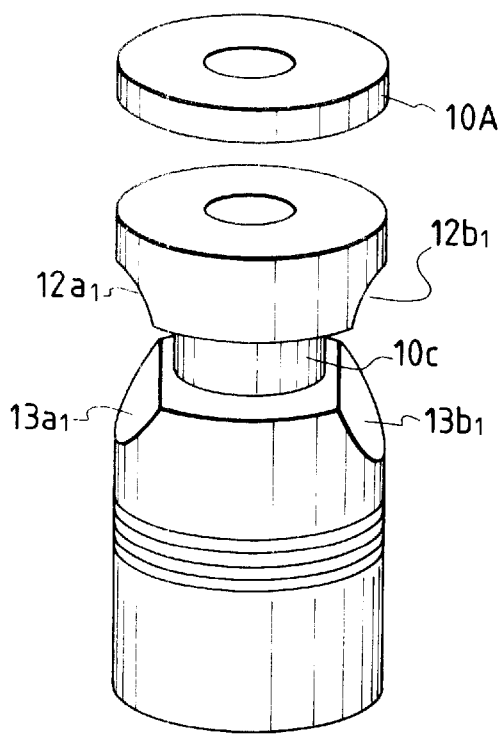
FIG. 24 shows a vibration member having a buzz-proof structure.

In a variant shown in FIG. 24, chamfered portions 12a1, 12b1, 13a1, and 13b1 are formed at corners above and below a circumferential groove 10c of a vibration member. Chamfering corners facilitates efficiency in machining. Moreover, since the upper chamfered portions 12a1 and 12b1 are not extending to a surface in contact with a moving body 10A, a contact radius becomes larger.

Figure 25:
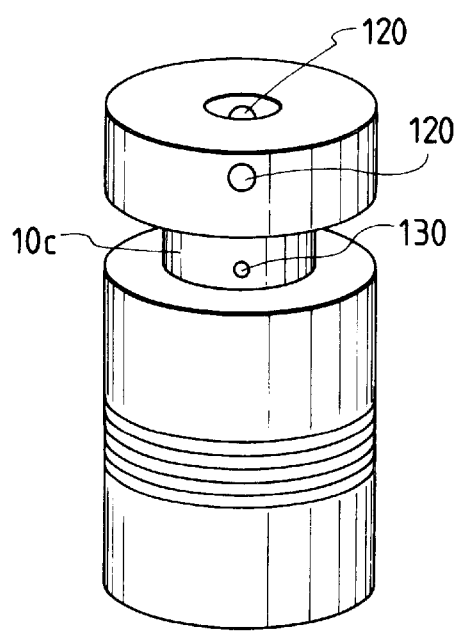
FIG. 25 shows a vibration member having a buzz-proof structure.

In a variant shown in FIG. 25, a through hole 120 is bored above the circumferential groove 10c instead of the chamfered portions 12a1 and 12b1, and a through hole 130 is bored on a small-diameter axis in the circumferential groove 10c instead of the chamfered portions 13a1 and 13b1. The shape of this variant facilitates efficiency in machining. Furthermore, a chamfer, a hole, or other portion of heterogeneous motion stiffness may be formed in the circumferential groove 10c of a vibration member.

Figure 26:
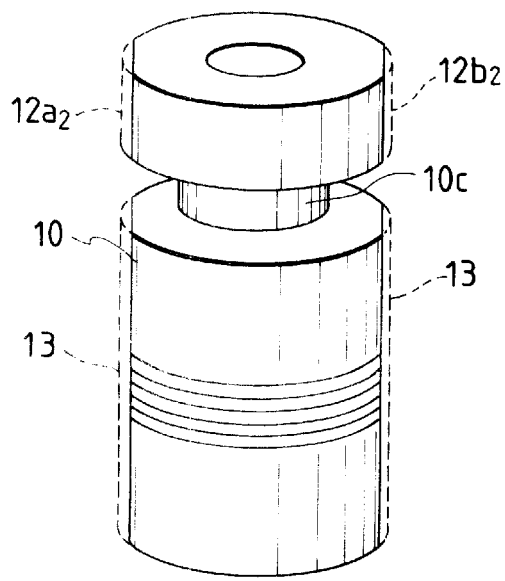
FIG. 26 shows a vibration member having a buzz-proof structure.

In a variant shown in FIG. 26, the chamfered portions 13a1 and 13b1 formed below the circumferential groove 10c are consistently extending through PZTs to a lower vibration member structure. This structure benefits manufacturing processes. Specifically, the chamfered planes can be used as reference planes in arranging electrode patterns of PZTs in an intended manner or in arranging chamfered planes of a vibration member in association with electrode patterns of PZTs serving as electromechanical energy conversion elements in an intended manner.

Figure 27A:
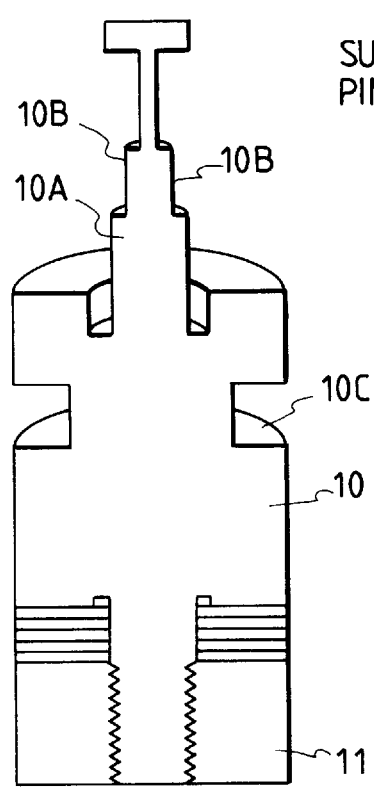
FIGS. 27A to 27C show a vibration member having a buzz-proof structure.
Figure 27B:
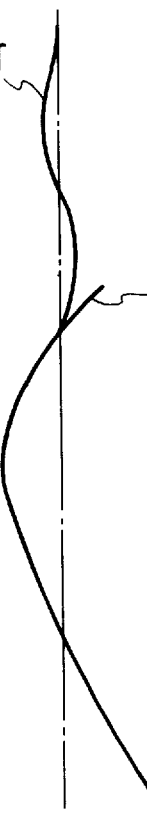
Figure 27C:
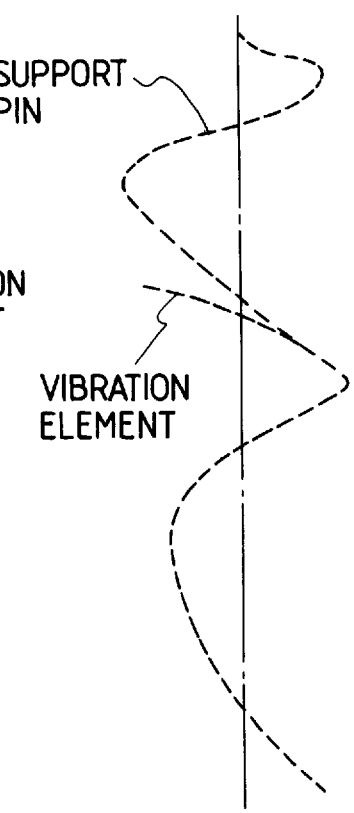

FIGS. 27A to 27C show another variant. FIG. 27A is an oblique view, wherein a cross section including an axis of a vibration member is viewed from obliquely above. This variant is designed to hinder a vibration member from generating a secondary bending vibration mode. Vibration member structures 10 and 11 are secured with a screw. On the upper vibration member structure 10, a supporting pin 10A for fixing the vibration member to a fixing member is formed and has chamfered portions 10B.

FIG. 27B shows a radial displacement distribution demonstrating a primary bending vibration mode a vibration member generates for a purpose of drive. FIG. 27C shows a radial displacement distribution demonstrating a secondary bending vibration mode causing a buzz.

FIGS. 27A to 27C reveal that the chamfered portions 10B formed on the supporting pin 10A provide a node for the vibration mode of the pin when the vibration member generates the primary vibration mode. When the vibration member generates the secondary vibration mode, the chamfered portions 10B provide a waxing portion for the vibration mode of the pin.

Therefore, the presence of chamfered portions which are axially asymmetrical affects the undamped natural frequencies of two transverse natural vibration modes for the secondary vibration mode more greatly than those of the primary driving vibration mode.

Consequently, when the undamped natural frequencies of two transverse natural vibration modes for the secondary vibration mode causing a buzz are deviated from each other, a buzz can be avoided with little influence on the driving vibration mode.

This variant has the secondary advantage below in avoiding a buzz.

Even when a vibration displacement occurs all over the supporting pin, it is greater than a displacement of the vibration member for the secondary vibration mode causing a buzz, but smaller for the driving vibration mode.

Therefore, when a driving vibration occurs, the vibration member including the supporting pin causes only a small internal loss. However, the vibration member induces a large internal loss in a secondary vibration.

A large internal loss requires more energy for vibration growth. This in turn hinders occurrence of a vibration causing a buzz without deteriorating a motor driving efficiency.

To embody the above theory, the supporting pin must be designed so that it will occupy the vicinity of the node of the primary bending vibration mode and a portion showing a large vibration displacement of the secondary bending vibration mode, and that it will generate a natural vibration having a frequency that approximates the natural vibration frequency of the secondary bending vibration.

When chamfered portions 10B are formed to occupy the waxing portions of the natural vibration modes, a secondary advantage is provided.

In the above variant, two planes are chamfered as portions of heterogeneous motion stiffness. The number of chamfered planes may be one, or three or more.

Figure 10A:
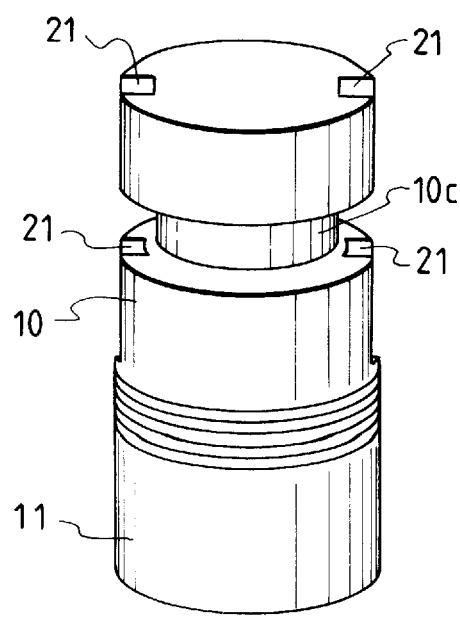
FIGS. 10A and 10B show a second embodiment.
Figure 10B:
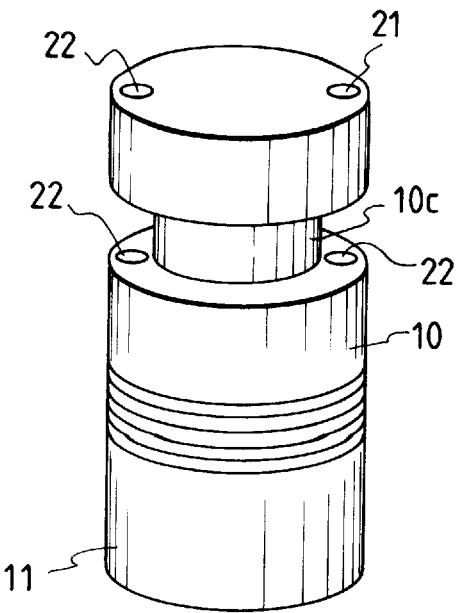

FIGS. 10A and 10B show a second embodiment of the present invention.

The aforesaid embodiment has chamfered portions 12a and 12b on a vibration member structure 10. The second embodiment provides the same advantages using means other than chamfers. In FIG. 10A, concave portions 21 are formed axially instead of the aforesaid chamfers. In this case, if a sliding surface of a moving body comes to the concave portions 21, friction powder is removed through these portions. In place of the concave portions 21, a through hole 22 running through a vibration member axially may be bored as shown in FIG. 10B.

Figure 11:
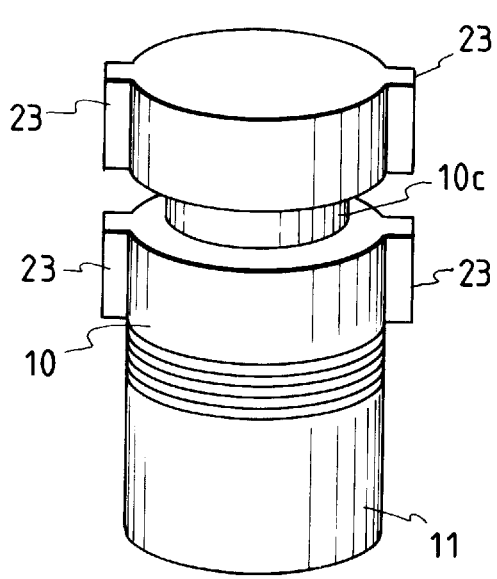
FIG. 11 shows a third embodiment.

FIG. 11 shows the third embodiment of the present invention.

In this embodiment, projections 23 opposite each other are provided on the outer circumference of a vibration member structure 10. The pair of projections 23 makes the vibration member axially asymmetrical. When the projections 23 are clamped using a supporting means (not shown) with felts or other damping materials interposed, the vibration member will be supported securely.

Figure 12:
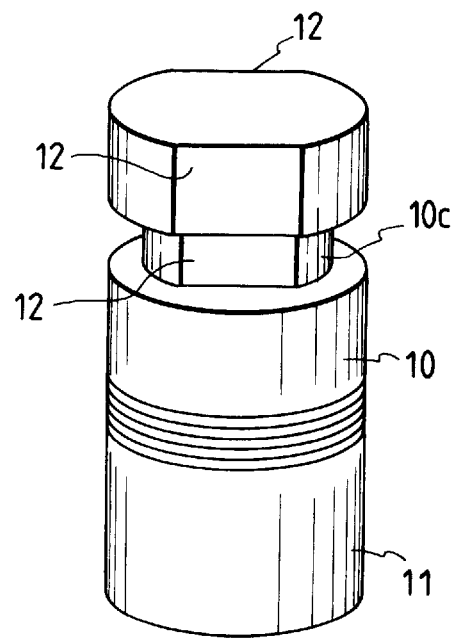
FIG. 12 shows a fourth embodiment.

FIG. 12 shows the fourth embodiment of the present invention.

In this embodiment, chamfered portions 12a and 12b of a vibration member structure 10 are formed on the upper axis located above a circumferential groove 10c and on a small-diameter axis in the circumferential groove 10c.

In this embodiment, the chamfered portions located on the small-diameter axis in the circumferential groove 10c have the same advantages as notches 13a and 13b on a vibration member in the first embodiment. Due to the chamfered portions, the undamped natural frequency of a vibration transverse to the chamfered planes decreases more greatly than that of a vibration parallel to the chamfered planes.

Figure 13:
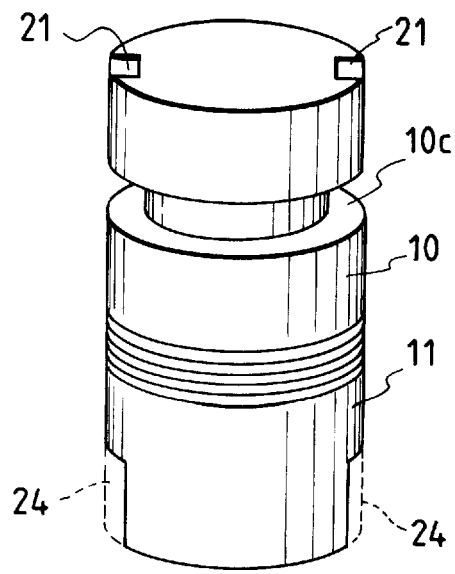
FIG. 13 shows a fifth embodiment.

FIG. 13 shows a fifth embodiment of the present invention.

In this embodiment, concave portions 21 are formed on an axis of a vibration member structure 10 located above a circumferential groove 10c in the axial direction, and chamfered portions 24 are formed in the lower part of a lower vibration member structure 2.

Chamfers, grooves, and projections for vibration member structures are not limited to those of the aforesaid embodiments but may be combined freely. The locations are not restricted to those of the aforesaid embodiments but may be combined freely.

FIGS. 14A to 14D show a sixth embodiment of the present invention.

In the aforesaid first to fifth embodiments, a vibration member has a cylindrical shape. However, a vibration member 30 of this embodiment is, as shown in FIG. 14A, shaped like a flat plate as a whole, and recognized generally as a cylinder whose sides are chamfered. As shown in FIG. 14B, a mode of a primary bending vibration is formed in the A direction, while a mode of a secondary bending vibration is formed in the B direction.

In this embodiment, the vibration member 30 is thinner in the B direction. Therefore, the undamped natural frequency in the B direction is lower. The undamped natural frequency of a secondary vibration mode in the B direction shown in FIG. 14D is substantially the same as that of a primary vibration mode in the A direction shown in FIG. 14C.

The present invention can be embodied not only by changing the patterns of transverse vibration modes but also by changing the degrees of the modes.

In motors whose driving frequencies range from 35 to 45 kHz as those of the aforesaid embodiments, a difference between bidirectional undamped natural frequencies does not decrease the rotating speed markedly, as the difference does not exceed about 100 Hz.

FIG. 15 shows a seventh embodiment of the present invention.

In the aforesaid embodiments, a part of a vibration member is axially asymmetrical and vibration directions are determined uniquely. In this embodiment, however, materials having different material constants or properties (for example, elastic coefficient and density) are arranged axially asymmetrically to form vibration structures. In an upper vibration member structure 41 having a circumferential groove 41c formed as a neck, portions 43 and 44 may be tempered with different materials of different properties.

Figure 16:
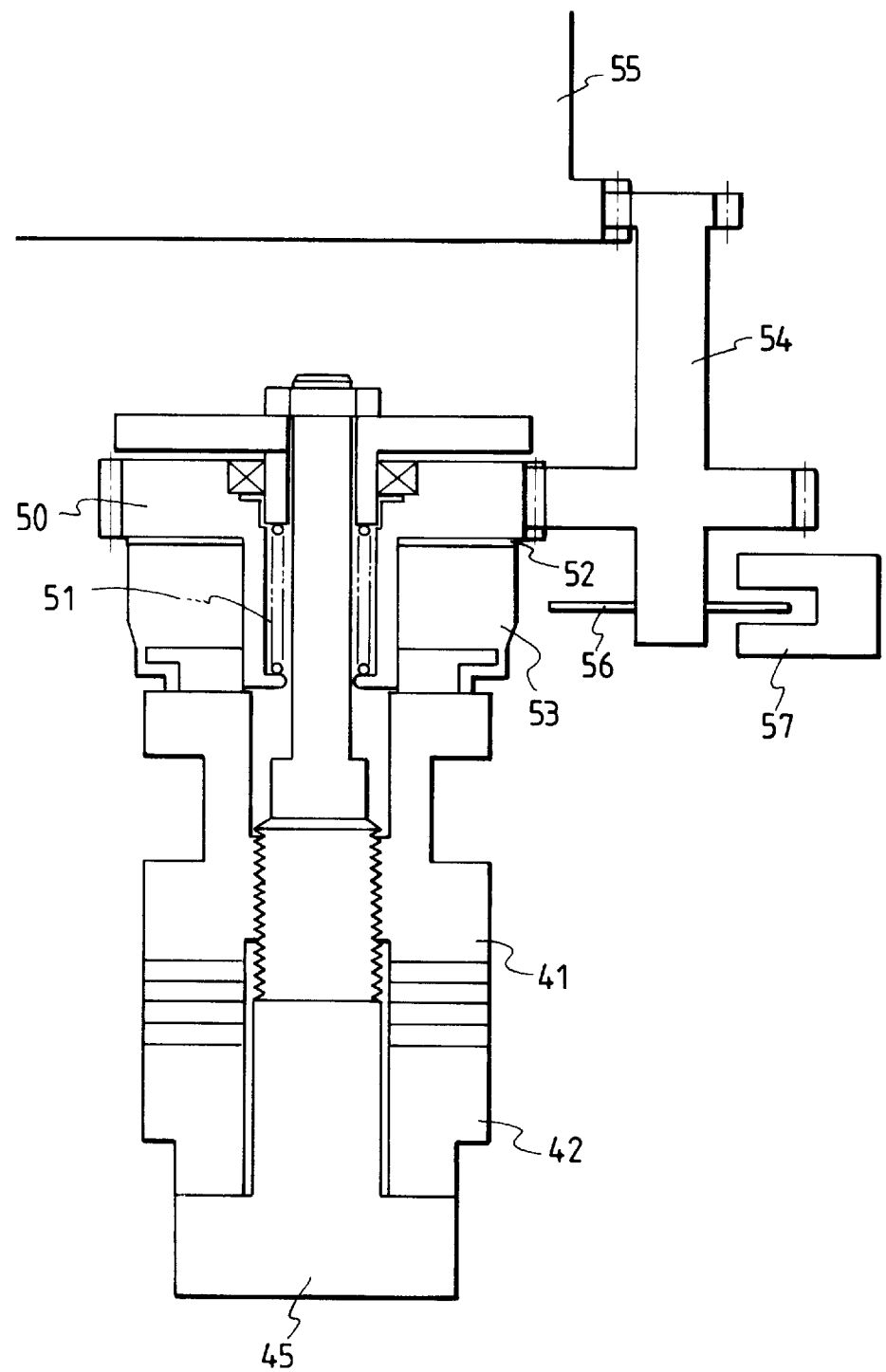
FIG. 16 is a schematic diagram of a device having an ultrasonic vibration driven motor as a driving source.

Ultrasonic vibration driven motors of the aforesaid embodiments can be employed as driving sources for cameras, office equipment, and others. FIG. 16 shows a driving device in which an ultrasonic vibration driven motor using a vibration member shown in FIG. 15 is employed as a driving source. Vibration member structures 41 and 42 are clamping PZTs and secured with a coupling bolt 45.

50 denotes an output member. A gear for extracting an output is formed on the outer circumferential surface of the output member 50. The output member 50 also serves as a coil spring receiver for receiving a spring force of a pressurization coil spring 51, and is coupled to a moving body 53 via a butyl rubber 52 by means of a friction force. 54 denotes a coupling gear. The coupling gear 54 engages a gear of the output member 50 to transmit a rotation driving force of the moving body 53 into, for example, a focus adjusting member 55 of a camera. On the other hand, the coupling gear 54 is provided with an encoder slit disk 56 and a photocoupler 57, for detecting a rotating position and speed.

As described so far, according to the present invention, the directions of two transverse natural vibration modes of a vibration member can be identified in advance. Therefore, two pairs of driving electromechanical energy conversion elements such as piezoelectric elements can be arranged to align in these directions. Then, when a phase difference between the AC fields applied to these pairs and the voltage amplitudes of the AC fields are set to predetermined values, an ideal circular movement can be excited in a vibration member driving surface. This results in improved motor efficiency.

The direction of a natural vibration mode having a higher frequency than the other of two natural vibration modes can be identified in advance. An electromechanical energy conversion element for detecting a vibration may be arranged to align in this direction, whereby a resonance frequency is detected to ensure stable control of vibrations.

What is claimed is:

1. A vibration device for a vibration driven motor comprising:
   a vibration member having an axis and a portion that makes the vibration member asymmetrical with respect to the axis; and
   an electromechanical energy conversion member for generating a combined vibration in the vibration member, said combined vibration comprising a first mode and a second mode, said first mode including a first bending vibration having a first direction, and said second mode including a second bending vibration having a second direction different from the first direction;
   wherein said portion of said vibration member determines a first natural frequency of said first mode or a second natural frequency of said second mode.

2. A vibration device according to claim 1, wherein said portion of said vibration member is chamfered.

3. A vibration device according to claim 1, wherein said vibration member is a bar type vibration member having a chamfer formed on each of two opposing planes of the bar type vibration member.

4. A vibration device according to claim 1, wherein said vibration member is a bar type vibration member having a chamfer formed on each of a plurality of portions of two opposing planes of the bar type vibration member.

5. A vibration device according to claim 1, wherein said portion includes a groove formed in said vibration member.

6. A vibration device according to claim 1, wherein said portion includes a hole formed in said vibration member.

7. A vibration device according to claim 1, wherein said portion includes a projection formed on said vibration member.

8. A vibration device according to claim 1, wherein said vibration member substantially is composed of a first material, and said portion of said vibration member is composed of a second material different from said first material.

9. A vibration device according to claim 8, wherein said vibration member is a bar type vibration member, and said portion composed of a second material is formed at two opposing locations on said bar type vibration member.

10. A vibration driven motor, comprising:
    a vibration member having an axis;
    an electromechanical energy conversion member for generating a combined vibration in said vibration member, said combined vibration comprising a first mode and a second mode, said first mode including a first bending vibration having a first direction, and said second mode including a second bending vibration having a second direction different from the first direction;
    setting means for setting a first natural frequency of said first mode or a second natural frequency of said second mode, said setting means including a portion that makes the vibration member asymmetrical with respect to the axis; and
    a contact member arranged in contact with said vibration member and driven by the bending vibration.

11. A vibration driven motor according to claim 10, wherein said portion of said vibration member is chamfered.

12. A vibration driven motor according to claim 11, wherein said vibration member is a bar type vibration member having a chamfer formed on each of two opposing planes of the bar type vibration member.

13. A vibration driven motor according to claim 11, wherein said vibration member is a bar type vibration member having a chamfer formed on each of a plurality of portions of two opposing planes of the bar type vibration member.

14. A vibration driven motor according to claim 10, wherein said setting means includes a groove formed in said vibration member.

15. A vibration driven motor according to claim 10, wherein said setting means includes a hole formed in said vibration member.

16. A vibration driven motor according to claim 10, wherein said setting means includes a projection formed on said vibration member.

17. A vibration driven motor according to claim 10, wherein said vibration member substantially is composed of a first material, and said portion of said vibration member is composed of a second material different from said first material.

18. A vibration driven system, comprising:

a vibration member having an axis;

an electromechanical energy conversion member for generating a combined vibration in said vibration member, said combined vibration comprising a first mode and a second mode, said first mode including a first bending vibration having a first direction, and said second mode including a second bending vibration having a second direction different from the first direction;

setting means for setting a first natural frequency of said first mode or a second natural frequency of said second mode, said setting means including a portion that makes the vibration member asymmetrical with respect to the axis;

a rotary member arranged in contact with said vibration member; and a movable member, driven by said rotary member, for driving a load provided in said system.

19. A vibration device for a vibration driven motor, comprising:

a bar type vibration member having an axis extending in a predetermined direction, the vibration member including a chamfer formed on a plurality of portions of two opposed planes of the bar type vibration member such that a part of the member is axially asymmetrical; and an electromechanical energy conversion member for generating a combined vibration in said vibration member in response to a signal applied thereto, the conversion member generating vibrations for bending said vibration member in a first direction and a second direction different from the first direction, whereby the combined vibration is generated in said vibration member.

20. A vibration device for a vibration driven motor, comprising:

a vibration member having an axis extending in a .predetermined direction, the vibration member including a portion that makes a part of the member axially asymmetrical, said vibration member substantially being composed of a first material, and said portion being composed of a second material different from the first material; and an electromechanical energy conversion member for generating a combined vibration in said vibration member in response to a signal applied thereto, the conversion member generating vibrations for bending said vibration member in a first direction and a second direction different from the first direction, whereby the combined vibration is generated in said vibration member.

21. A vibration device according to claim 20, wherein said vibration member is a bar type vibration member, and said portion composed of a second material different from the first material is formed at two opposed locations on said bar type vibration member.

22. A vibration driven motor, comprising:

a vibration member having an axis extending in a predetermined direction, the member including a portion that makes a part of the member axially asymmetrical, said vibration member substantially being composed of a first material, and said portion being composed of a second material different from said first material;

an electromechanical energy conversion member for generating a combined vibration in said vibration member in response to a signal applied thereto, the conversion member generating vibrations for bending said vibration member in a first direction and a second direction different from the first direction, whereby the combined vibration is generated in said vibration member; and a contact member arranged in contact with said vibration member and driven by the combined vibration.

23. A vibration driven motor actuator, comprising:

a vibration member having an axis;

an electromechanical energy conversion member for generating a combined vibration in said vibration member, said combined vibration comprising a first mode and a second mode, said first mode including a first bending vibration having a first direction, and said second mode including a second bending vibration having a second direction different from the first direction; and setting means for setting a first natural frequency of said first mode or a second natural frequency of said second mode, said setting means including a pair of portions, provided at respective opposing planes of said vibration member, said pair of portions making the vibration member asymmetrical with respect to the axis;

wherein said electro-mechanical energy conversion member includes first and second conversion elements for generating in said vibration member said first and second bending vibrations in response to a signal applied thereto, one of said first and second conversion elements being contacted to the vibration member so that a respective one of said first and second bending vibrations is generated substantially along a line connecting respective centers of said pair of portions of said vibration member.

24. A vibration driven actuator according to claim 23, wherein said first and second conversion elements of the electro-mechanical energy conversion member are stacked.

25. A vibration driven actuator comprising:

a vibration member that generates therein at least first and second bending vibrations that generate a vibration wave in said vibration member in response to an applied electrical signal, the first bending vibration having a natural frequency which is higher than a natural frequency of the second bending vibration; and a detecting member attached to the vibration member for detecting a state of said vibration wave, a direction of orientation of said detecting member being substantially coincident with a direction of the first bending vibration, said detecting member generating a control signal representing the state of said vibration wave, a frequency of said applied electrical signal being controlled on the basis of the control signal.

26. A vibration driven actuator according to claim 25, wherein said detecting member includes a piezoelectric element.

27. A vibration driven actuator according to claim 25, further comprising:

an electromechanical energy conversion member having a plurality of conversion elements arranged to generate in said vibration member the first and second bending vibrations with a phase difference in time therebetween in response to an applied driving signal having a frequency which substantially coincides with the natural frequency of the first being vibration.

28. A vibration driven actuator according to claim 26, further comprising:

an electromechanical energy conversion member having a plurality of conversion elements arranged to generate in said vibration member the first and second bending vibrations with a phase difference in time therebetween in response to an applied driving signal having a frequency which substantially coincides with the natural frequency of the first bending vibration.

29. A vibration driven actuator according to claim 27, wherein said conversion member generates two vibration waves having a phase difference in time and space therebetween.

30. A vibration driven actuator according to claim 28, wherein said conversion member generates two vibration waves having a phase difference in time and space therebetween.

31. A vibration driven actuator according to claim 29, wherein each of said conversion elements is attached to the vibration member so that a direction of vibration generated by respective ones of said conversion elements substantially coincides with a direction of respective ones of the first and second bending vibrations.

32. A vibration driven actuator according to claim 30, wherein each of said conversion elements is attached to the vibration member so that a direction of vibration generated by respective ones of said conversion elements substantially coincides with a direction of respective ones of the first and second bending vibrations.

* * * * *

UNITED STATES PATENT AND TRADEMARK OFFICE
CERTIFICATE OF CORRECTION

| | | |
|---|---|---|
| PATENT NO. : | 5,886,455 | Page 1 of 2 |
| DATED : | March 23, 1999 | |
| INVENTOR(S) : | TAKAYUKI TSUKIMOTO | |

It is certified that error appears in the above-indentified patent and that said Letters Patent is hereby corrected as shown below:

On the title page, item

At [63] Related U.S. Application Data

"Oct. 20, 1996," should read --Oct. 20, 1992,--.

At [56] References Cited

FOREIGN PATENT DOCUMENTS

"0469883 of 0000 " should read --0 469 883  5/1992--; and

" 6-3224678  of 0000" should read --63-224678  1/1989--.

Column 1

Line 50, "portions surface" should read --surface portions--.

Column 2

Line 27, "situation;" should read --situation,--.
Line 50, "description" should read --description given--.
Line 62, "Vibration" should read --vibration--.

Column 4

Line 1, "cross section" should read --cross-section--.

UNITED STATES PATENT AND TRADEMARK OFFICE
CERTIFICATE OF CORRECTION

PATENT NO. : 5,886,455
DATED : March 23, 1999
INVENTOR(S) : TAKAYUKI TSUKIMOTO

It is certified that error appears in the above-indentified patent and that said Letters Patent is hereby corrected as shown below:

<u>Column 9</u>

Line 7, "cross section" should read --cross-section--.

<u>Column 10</u>

Line 11, "the" (first occurrence) should read --a--.
    Line 20, "the" (first occurrence) should read --a--.

Signed and Sealed this

Fourteenth Day of September, 1999

Attest:

Q. TODD DICKINSON

*Attesting Officer*     *Acting Commissioner of Patents and Trademarks*